Sept. 16, 1941.   M. S. ARIENS   2,256,185
GROUND WORKING IMPLEMENT
Filed Oct. 9, 1939   2 Sheets-Sheet 1

Inventor
M. S. Ariens
By
Attorneys

Sept. 16, 1941.  M. S. ARIENS  2,256,185
GROUND WORKING IMPLEMENT
Filed Oct. 9, 1939  2 Sheets-Sheet 2
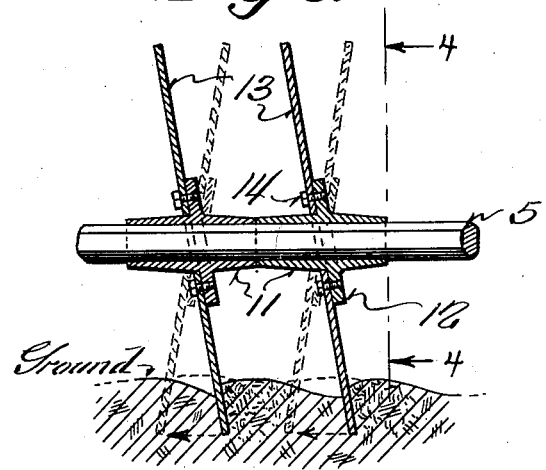
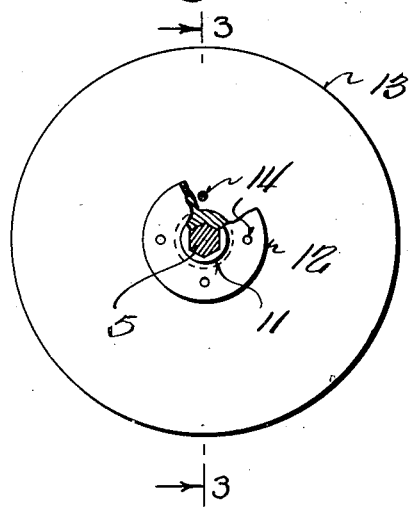
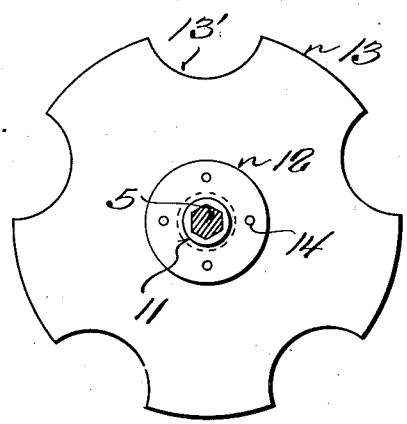
Inventor
M. S. Ariens
By
Attorneys Patented Sept. 16, 1941

2,256,185

UNITED STATES PATENT OFFICE 2,256,185

GROUND WORKING IMPLEMENT

Mando S. Ariens, Brillion, Wis.

Application October 9, 1939, Serial No. 298,639

1 Claim. (Cl. 97—212)

This invention pertains generally to ground-working implements, and more particularly to a machine capable of scarifying, pulverizing, and mixing top ground or material without noticeable furrows.

While the tool comprising the essence of the present invention may be employed in various types of implements, it is particularly adaptable to machines of the general type shown in United States Letters Patent No. 2,025,494, in which the earth-working tools are carried by a tractor-drawn trailer, and independently driven by a power take-off from the tractor. However, it is to be understood that the tools comprising the invention may be operatively connected with the traction wheels of the implement, or an independent power unit carried by the implement. Also, the invention is applicable to conventional disc harrows in which the discs are rotated through engagement with the ground. Therefore, the invention is not to be limited to a special type of implement.

The invention has primarily for its object to provide implements of the foregoing type with a highly novel ground-working tool in the form of a rotatable disc disposed in a plane at an acute angle to the longitudinal axis of its supporting shaft, whereby the edge of the tool defines a fluted path as it rotates through the ground.

With the above and other objects in view, which will appear as the description proceeds, the invention resides in the novel construction, combination, and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 3 is an enlarged, fragmentary section of the ground-working tools comprising the invention, the same being taken on the line 3—3 of Figure 4.

Figure 4 is a detail section taken on the line 4—4 of Figure 3.

Figure 5 is a side elevation of a modified form of the tool.

Figure 1:
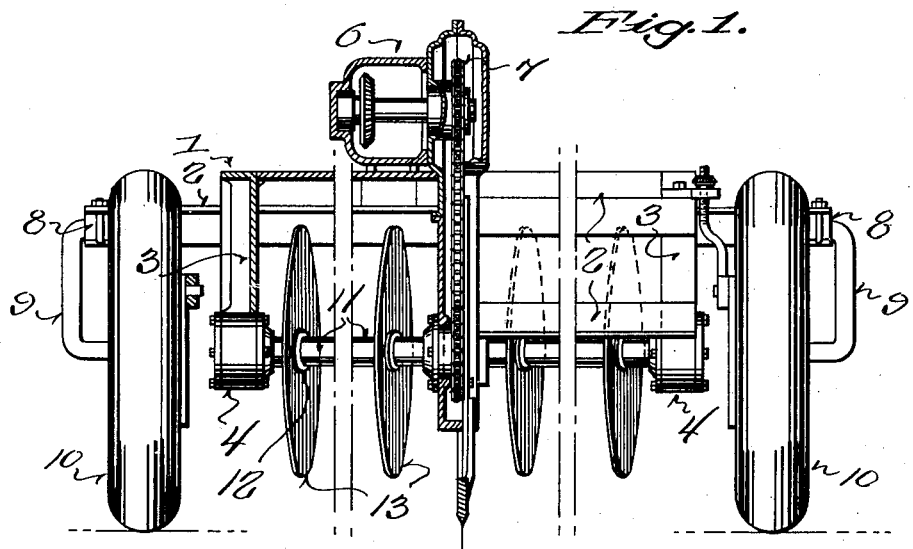
Figure 1 is a front elevation of a conventional tractor-drawn implement, partially in section, as indicated by the line 1—1 of Figure 2, and equipped with the present invention.

Referring now more particularly to the accompanying drawings, the implement illustrated comprises a frame designated by the numeral 1, and including spaced, parallel, transverse beams 2 connected at their ends to depending brackets 3, that carry suitable bearings 4 in which a transverse shaft 5 is journaled.

Figure 2:
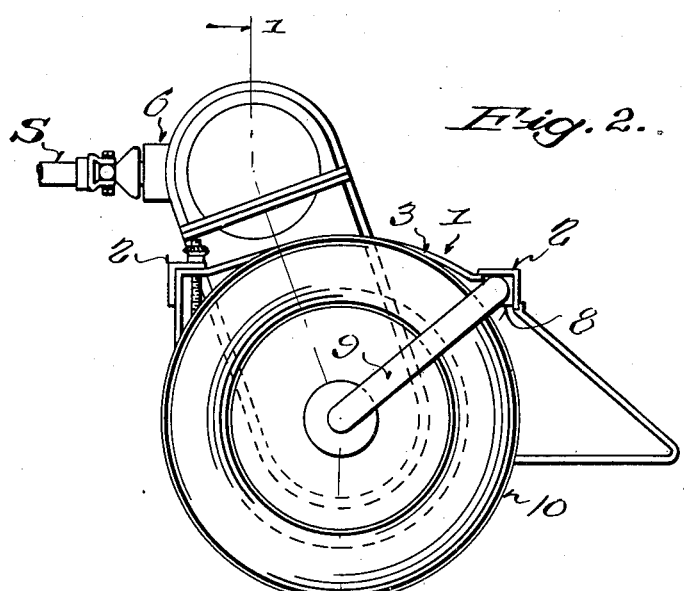
Figure 2 is an end elevation of the same.

Mounted upon the transverse beams is a transmission 6 operatively connected with the shaft 5 by a chain-and-sprocket drive. As indicated in Figure 2, the transmission 6 is operated by a power take-off shaft S connected with a tractor (not shown).

Secured to the ends of the rear transverse beam 2 are bearing blocks 8 in which stub axles 9 are journaled for pivotal adjustment with relation to the frame. Supporting wheels 10 are mounted upon the stub axles 9.

The foregoing structure is more or less conventional, and is illustrated and described in considerable detail in said United States Letters Patent No. 2,025,494, and, therefore, the same forms no specific part of the present invention, other than as set forth in the combination hereinafter claimed.

As best shown in Figure 3, the transverse shaft 5 is preferably hexagonal in cross section for reception of a plurality of abutting hubs 11 provided with annular flanges 12 intermediate their ends, to which discs 13 are detachably secured by threaded studs or bolts 14.

Inasmuch as the flanges 12, and, consequently, the discs 13 are disposed in planes at acute angles to the longitudinal axis of the shaft 5, it will be obvious that as the discs 13 rotate with the shaft, their edges will oscillate about their diametric axes, as indicated in dotted lines in Figure 3. Naturally, the effect of such action causes the ground engaged by the discs to be displaced alternately in opposite directions with relation to the plane of the discs, which action results in a thorough working of the top ground, and because of the rapidity of the displacing action, no noticeable furrows will be left by the discs.

In that form of the invention illustrated in which the discs are independently driven through an operative connection with the power plant of the tractor, it will be understood that the speed at which the discs are rotated may be varied as desired, to either increase or diminish the extent of ground displacement by the discs. Also, the extent of ground displacement may be further controlled by the angle at which the discs are set with relation to the longitudinal axis of their supporting shaft.

The modified disc shown in Figure 5 is provided with peripheral notches 13', which facilitates its scarifying or breaking action upon engagement with the ground. Obviously, tooth or other form discs may be employed to meet varying conditions encountered.

From the foregoing explanation considered in connection with the accompanying drawings, it will be seen that a highly novel and effective ground-working tool has been provided for implements, whether tractor- or horse-drawn or self-propelled, and because of the action resulting from displacement of the ground by the tools, the same are adaptable to practically all kinds of agricultural and roadwork in which it is desired to scarify, pulverize, or cultivate the ground, leaving it comparatively smooth and without noticeable furrows.

Furthermore, due to the rapid alternate displacement of material on opposite sides of the discs, a thorough mixing action is obtained, which is particularly desirable in use on roads treated with powdered cement, asphalt, or other surfacing material, which must be mixed thoroughly with the ground or top material of the road.

As previously stated, it will also be understood that in some instances, particularly in tractor-drawn implements, the disc shaft may be operatively connected with the traction wheels to effect their drive; while, on the other hand, should the implement be horse-drawn, the discs may be driven independently of the traction of the implement by a power unit on the implement frame.

When the invention is applied to conventional disc harrows, the discs may be either driven by the implement traction, or, in instances where the discs serve as the traction means, the same are rotated through engagement with the ground.

I claim:

A ground-working implement comprising, a frame supported by traction wheels, a transverse hexagonal driven shaft journaled in said frame, a plurality of spaced ground engaging discs mounted on said shaft and disposed in parallel planes at an acute angle to the longitudinal axis of said shaft, hubs mounted on said shaft and abutting each other, said hubs being provided with flanges intermediate their ends, said discs being slidably mounted on the hubs for abutting contact with the flanges, fastening elements extending through the discs and into said flanges for binding said discs to the flanges, and power-driven means for rotating said hexagonal shaft.

MANDO S. ARIENS.